(12) United States Patent
Meskauskas et al.

(10) Patent No.: US 9,553,933 B2
(45) Date of Patent: Jan. 24, 2017

(54) METHOD AND APPARATUS FOR COMMUNICATION SESSION-BASED INITIATION OF NETWORKED TERMINALS

(75) Inventors: Paulius Meskauskas, Helsinki (FI); Tommy Sven Ingvald Staffans, Espoo (FI); Niklas Tony Von Knorring, Espoo (FI)

(73) Assignee: Nokia Corporation, Espoo (FI)

( * ) Notice: Subject to any disclaimer, the term of this patent is extended or adjusted under 35 U.S.C. 154(b) by 210 days.

(21) Appl. No.: 13/538,363

(22) Filed: Jun. 29, 2012

(65) Prior Publication Data
US 2014/0006631 A1    Jan. 2, 2014

(51) Int. Cl.
| | |
|---|---|
| *G06F 15/16* | (2006.01) |
| *G06F 15/177* | (2006.01) |
| *H04L 29/08* | (2006.01) |
| H04W 4/02 | (2009.01) |
| H04W 76/02 | (2009.01) |

(52) U.S. Cl.
CPC ........... *H04L 67/146* (2013.01); *H04L 67/18* (2013.01); *H04L 67/26* (2013.01); *H04W 4/02* (2013.01); *H04W 76/02* (2013.01)

(58) Field of Classification Search
CPC ........ H04L 67/14; H04W 4/023; H04W 4/206
USPC .................. 709/227–229, 230–232, 220, 222,709/204–207
See application file for complete search history.

(56) References Cited

U.S. PATENT DOCUMENTS

| | | | | |
|---|---|---|---|---|
| 6,088,728 A * | 7/2000 | Bellemore | ........ | H04L 29/12924 709/225 |
| 8,589,808 B1 * | 11/2013 | Alfaro | ...................... | G06F 3/00 709/204 |
| 2006/0123122 A1 * | 6/2006 | Jung | ........................ | H04L 67/14 709/227 |
| 2007/0047523 A1 | 3/2007 | Jiang | | |
| 2009/0049158 A1 * | 2/2009 | Krishnaswamy | . | H04L 29/08072 709/220 |
| 2009/0235329 A1 | 9/2009 | Chavez et al. | | |
| 2009/0319616 A1 * | 12/2009 | Lewis, II | .............. | H04W 24/00 709/206 |
| 2010/0029302 A1 | 2/2010 | Lee et al. | | |

(Continued)

FOREIGN PATENT DOCUMENTS

| | | |
|---|---|---|
| EP | 2395735 A2 | 12/2001 |
| WO | WO 2004/077210 A2 | 9/2004 |

OTHER PUBLICATIONS

Thrutu, What permissions does Thruru for Android need, and why?, web page, printed Oct. 10, 2012, pp.1-4, http://community.thrutu.com/thrutu/topics/what_permissions_does_thrutu_for_android_need_and_why.

Thrutu, web page, printed Oct. 10, 2012, 1 page, © 2011 Thrutu, a division of Metaswitch Networks, http://thrutu.com/.

*Primary Examiner* — Edward Kim
(74) *Attorney, Agent, or Firm* — Ditthavong & Steiner, P.C.

(57) ABSTRACT

An approach is provided for using one or more identification parameters of terminals associated with a communication session to initiate another communication session among the terminals. A communication platform determines one or more identification parameters associated with one or more terminals participating in at least one communication session. The communication platform further causes, at least in part, an initiation of at least one other communication session among the one or more terminals based, at least in part, on the one or more identification parameters.

20 Claims, 15 Drawing Sheets

(56) References Cited

U.S. PATENT DOCUMENTS

| | | |
|---|---|---|
| 2010/0036779 A1* | 2/2010 | Sadeh-Koniecpol ............... H04L 63/20 706/11 |
| 2010/0299060 A1* | 11/2010 | Snavely ................. G06Q 10/02 701/533 |
| 2011/0312303 A1 | 12/2011 | Brush et al. |
| 2012/0166531 A1* | 6/2012 | Sylvain ................. H04L 51/043 709/204 |
| 2014/0250191 A1* | 9/2014 | Altman .............. G06Q 30/0207 709/204 |
| 2015/0172393 A1* | 6/2015 | Oplinger ................. H04L 67/18 709/204 |

* cited by examiner

METHOD AND APPARATUS FOR COMMUNICATION SESSION-BASED INITIATION OF NETWORKED TERMINALS

BACKGROUND

Service providers and device manufacturers (e.g., wireless, cellular, etc.) are continually challenged to deliver value and convenience to consumers by, for example, providing compelling network services. Such network services include the ability to share information between devices. However, the ability to use such network services to share information requires configuring the devices or applications executed on the devices with usernames and passwords. The ability to use such network services also may require defining groups or circles of users that share common attributes and that will have access to the same level of information access. Accordingly, service providers and device manufacturers face significant technical challenges regarding permitting the sharing of information in a user-friendly way.

SOME EXAMPLE EMBODIMENTS

Therefore, there is a need for an approach for using one or more identification parameters of terminals associated with a communication session to initiate another communication session among the terminals.

According to one embodiment, a method comprises determining one or more identification parameters associated with one or more terminals participating in at least one communication session. The method also comprises causing, at least in part, an initiation of at least one other communication session among the one or more terminals based, at least in part, on the one or more identification parameters.

According to another embodiment, an apparatus comprises at least one processor, and at least one memory including computer program code for one or more computer programs, the at least one memory and the computer program code configured to, with the at least one processor, cause, at least in part, the apparatus to determine one or more identification parameters associated with one or more terminals participating in at least one communication session. The apparatus is also caused to initiate at least one other communication session among the one or more terminals based, at least in part, on the one or more identification parameters.

According to another embodiment, a computer-readable storage medium carries one or more sequences of one or more instructions which, when executed by one or more processors, cause, at least in part, an apparatus to determine one or more identification parameters associated with one or more terminals participating in at least one communication session. The apparatus is also caused to initiate at least one other communication session among the one or more terminals based, at least in part, on the one or more identification parameters.

According to another embodiment, an apparatus comprises means for determining one or more identification parameters associated with one or more terminals participating in at least one communication session. The apparatus also comprises means for causing, at least in part, an initiation of at least one other communication session among the one or more terminals based, at least in part, on the one or more identification parameters.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for initiating a communication session based on one or more identification parameters of terminals associated with an existing communication session are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
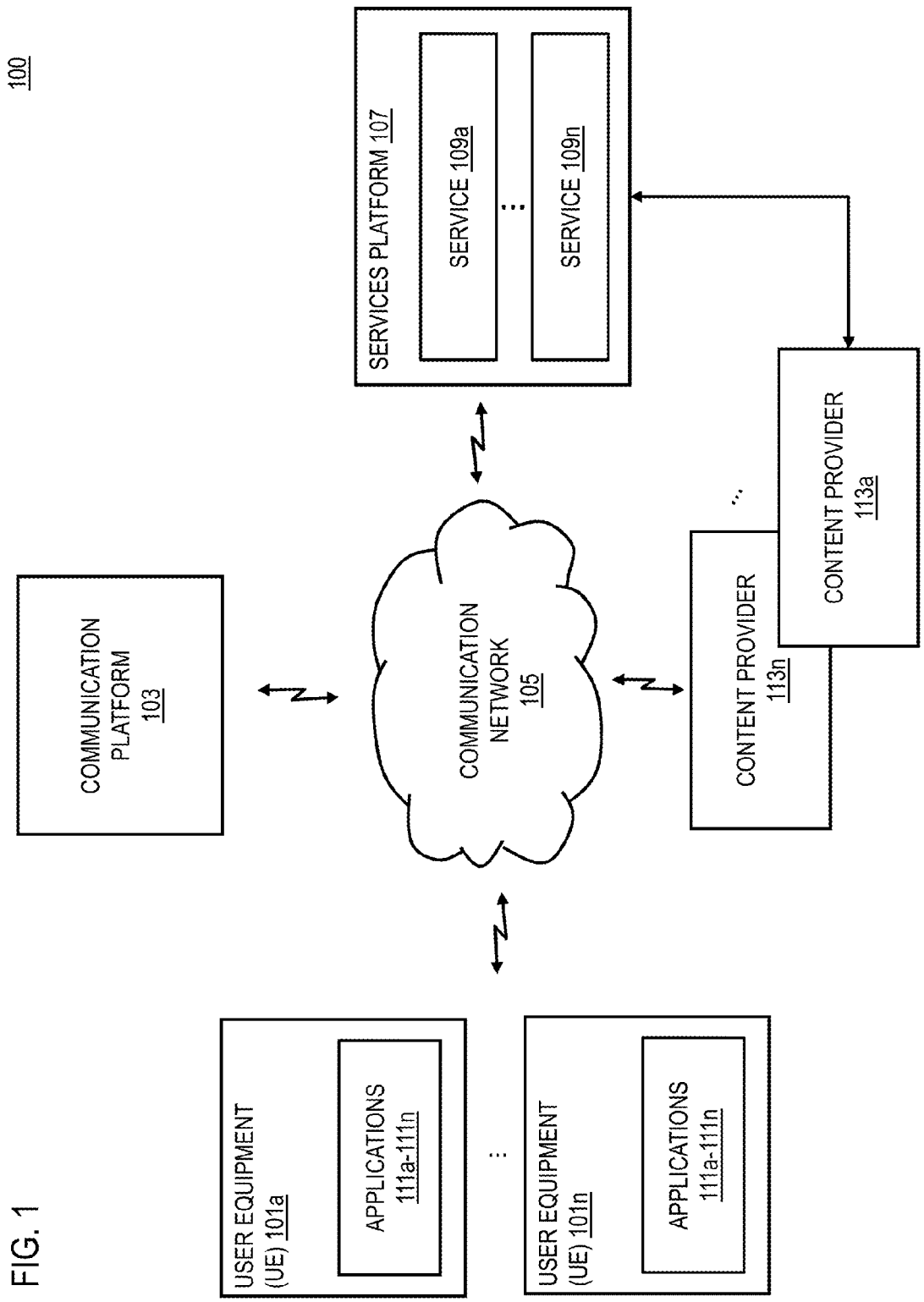
FIG. 1 is a diagram of a system capable of initiating a communication session based on one or more identification parameters of terminals associated with an existing communication session, according to one embodiment.

FIG. 1 is a diagram of a system capable of initiating a communication session based on one or more identification parameters of terminals associated with an existing communication session, according to one embodiment. Service providers and device manufacturers continue to find new ways for user to share information between devices. Services, such as social networking services, allow users to share content, such as statuses, pictures, videos, etc. with other users. However, such services face the issue of privacy—preventing unwanted users from viewing and/or downloading the shared content. At times, a user would like to control who, even among their trusted friends within a social networking service, is able to see the shared content. Further, such services face issues regarding the complexity of using the services. For example, to increase the security of the services, the services include authentication measures, which often require security credentials (e.g., usernames and passwords). Although such authentication increases the security of the services, the authentication adds to the complexity of using the services. Additionally, to control who can view the shared content, such services may allow users to group their friends and/or classify their friends. However, such grouping or classification also further adds to the complexity of using the services. A user may wish to quickly share his or her location with a select group of friends and not have to take the time to distinguish the select group of friends among the entire group of friends associated with a service. Accordingly, services providers and device manufacturers face significant technical challenges in creating a way for users to share information with a desired one or more other uses while reducing the complexity in initiating the sharing.

To address these problems, a system 100 of FIG. 1 introduces the capability to apply one or more identification parameters of terminals associated with a communication session to initiating another communication session among the terminals. The communication session may be based on any type of communication, such as a voice call (e.g., phone call, VoIP call, etc.), an SMS and/or MMS message, an e-mail message, instant messaging, and the like. Although many embodiments discussed below are discussed with respect to a phone call using mobile devices, the communication session is not limited to only this type of communication session.

Similarly, the other communication session that is initiated can be based on any type of communication. In one embodiment, the other communication session that is initiated may be a data connection between the one or more terminals that permits the exchange of data/information associated with one or more applications 111 (discussed in detail below) executing at the one or more terminals. By way of example, the two terminals may be executing a location-based application 111a and the other communication session that is initiated between the two terminals may be a data connection that allows for the transmission of location information between the two terminals.

The one or more identification parameters may be any type of parameter that identifies the associated terminal taking part in the communication session. By way of example, possible identification parameters include a Mobile Subscriber Integrated Services Digital Network (MSISDN) number, a mobile equipment identifier (MEID), an electronic serial number (ESN), a phone number, an e-mail address, and the like. In one embodiment, the initial communication session defines what identification parameters are used. For example, where the initial communication session is e-mail, the identification parameter may be an e-mail address. The associated terminals may be any devices that are able to communicate with another device and/or service. As shown in FIG. 1, the system 100 comprises a user equipment (UE) 101a-101n (collectively referred to as UE 101) having connectivity to a communication platform 103 via a communication network 105. The UE 101 may constitute to a terminal. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111*a*-111*n* (collectively referred to as applications 111) that may perform one or more functions and/or services at the UE 101. The applications 111 may be any type of application, such as map-based applications, location-based applications, calendar-based applications, media-based applications, news-based applications, etc. In one embodiment, a map-based application 111*a* may provide information regarding the location of the UE 101*a* associated with the application 111*a*. A map-based application 111*a* may also provide information regarding the location of other devices (e.g., other UE 101), points-of-interests (e.g., restaurants, movie theaters, gas stations, etc.) and/or landmarks (e.g., mountains, rivers, lakes, etc.). The map-based applications and/or location-based applications may interface with one or more sensors at the UE 101 (e.g., GPS sensor) to determine the locations of the UE 101.

In one embodiment, the functions and/or processes performed by the communication platform 103 may be embodied in one or more of the applications 111. Further, in one embodiment, one of the applications 111 may be designed to interface with the communication platform 103 and act as a gateway for the other applications 111 at the UE 101 to interface with the communication platform 103. For example, the UE 101 may include a communication manager application 111*b* that interfaces with the communication platform 103 to, for example, provide the identification parameters associated with the UE 101 during an active communication session at the UE 101.

A map-based application 111*a* may also perform one or more navigation-based functions or processes such as providing directions for navigating between two points along a route. In one embodiment, the directions may be in the form of turn-by-turn directions, where each turn directing a user along the route is displayed based on the location of the user. In one embodiment, the directions may be in the form of directions represented within an augmented-reality representation of a surrounding environment of the user and/or UE 101*a* associated with the user. The directions may be overlaid on an image of the surrounding environment so that the user can visualize the surrounding environment while at the same time viewing the directions and/or route in relation to the surrounding environment. The route to travel from an origin to a destination may also be presented over the augmented-reality representation of the environment. Such a presentation allows for an augmented-reality, real-time guidance of the route.

In one embodiment, the map-based application 111*a* may include one or more algorithms that calculate the route between two points based on information associated with the map-based application 111*a*, such as information regarding street layouts, public transportation routes, traffic information, construction zones and/or accident information, etc. Thus, given two points (e.g., an origin and a destination), the map-based application 111*a* may calculate the route between the two points. In one embodiment, the map-based application 111*a* may allow a user to draw a route between two or more points on a map. The map-based application 111*a* may support a "free-hand" multi-modal user interface at the UE 101 that may allow a user to draw a route on a user interface presenting a map and have the map-based application 111*a* and/or a backend service (e.g., such one or more of the services 109, discussed below) calculate error adjustments associated with the drawn route, such as correcting for one-way streets, street restrictions, and the like. The map-based application 111*a* may also support a user drawing a route on a representation of a map without any error adjustments. In one embodiment, the map-based application 111*a* may support a hybrid approach for allowing users to draw routes between two or more points. The hybrid approach may provide route suggestions, or partial route segments with options to accept, reject or modify (e.g., by freehand) the suggested or partial route segments.

The system 100 also includes a services platform 107. The services platform 107 includes one or more services 109*a*-109*n* (collectively referred to as services 109) that provide various functions and/or processes to the UE 101 and/or other elements of the system 100. The applications 111 discussed above may instead, or in addition, be embodied in one or more of the services 109. For example, the services 109 may include map-based services, location-based services, calendar-based services, media-based services, news-based services, etc. In one embodiment, one of the services 109 may provide the location-based and/or navigation-based processes and functions of the map-based application 111*a* discussed above. In one instance, one or more applications 111 at the UE 101 may be associated with one or more services 109 at the services platform 107 to provide the functions and/or processes of the services 109 at the UE 101.

The system 100 also includes content providers 113*a*-113*n* (collectively referred to as content providers 113) that provide content to the elements of the system 100, such as to the UE 101 and/or the communication platform 103. By way of example, the content providers 113 may provide content related to one or more landmarks and/or points-of-interest to be displayed at a user interface of a map-based application 111a at the UE 101. The content providers 113 may also provide, for example, weather information that may be used in one or more of the applications 111 and/or one or more of the services 109, such as for calculating route information associated with a map-based application 111a or a map-based service 109a.

The communication platform 103 provides the processes and/or functions related to initiating a communication session based on one or more identification parameters of terminals (e.g., UE 101) associated with an existing communication session. An existing communication session may be any type of communication session, as discussed above (e.g., phone call, VoIP call, e-mail, SMS and/or MMS message, instant messaging, etc.). Associated with the communication session are one or more identification parameters that identify the terminals associated with the communication session. When the communication session is a phone call between two mobile devices, the identification parameters may be the telephone numbers associated with the mobile devices, or may be the MSISDN numbers associated with the mobile devices. The identification parameters uniquely identify the terminals associated with the communication session. Based on the communication session and the determined identification parameters, the communication platform 103 may cause an initiation of at least one other communication session among the terminals participating in the existing communication session based on the identification parameters. In one embodiment, the other communication session may be a data connection between the terminals that allows for the exchange of data between the two terminals independent from the initial communication session. In one example, the initiation of the other communication session creates an ad-hoc social networking communication session that allows for the transfer of information between the terminals. The information may be any type of information, such as location information, media information, calendar/appointment information, status information, etc. In one embodiment, the initiated communication session may be associated with multiple applications 111 at the terminals such that multiple applications 111 at both terminals may exchange information between the terminals over the initiated communication session. In one embodiment, the initiated communication session may be associated with a specific, single one of the applications 111 executed at the terminals participating in the initiated communication session.

Based on the foregoing, the initial communication session between the terminals acts as a creation mechanism for a subsequent communication session. The subsequent communication session can be created without requiring the users associated with the terminals to provide username information and/or authentication information (e.g., passwords, pass codes, etc.). Rather, the identification parameters associated with the initial communication session are used to identify and/or authenticate the users and/or terminals to create the subsequent communication session.

As discussed above, the subsequent communication session may be associated with one or more applications 111 executed at the terminals (e.g., UE 101) participating in the communication session. In one embodiment, the communication platform 103 causes a configuration of the one or more applications associated with the subsequent communication session based, at least in part, on the one or more identification parameters from the initial communication session that are used to initiate the subsequent communication session. The communication platform 103 may also cause a configuration of one or more services 109 associated with a subsequent communication session based, at least in part, on the one or more identification parameters from the initial communication session. Accordingly, the communication platform 103 allows users of the terminals to use one or more applications 111 and/or interact with one or more services 109 without having to provide credentials (e.g., login name, password, etc.) to the applications 111 and/or services 109. The communication platform 103 also allows users to share information with a select number of other users without having to create a group of friends within the applications 111 that allow for the sharing of information. For example, some social networking services allow the creation a group of friends to control who sees what content. This requires a user to designate what friends belong to what groups, which can be complicated or such an option may even be unknown to a user. By basing the terminals that are connected on the initial communication session, the communication platform 103 allows for the creation of ad-hoc groups without any additional input from the users other, which reduces the complexity. In one embodiment, the communication platform 103 prevents the sharing of information accidentally and/or within unknown or undesired other terminals (e.g., other users or parties) by requiring an acceptance from the user of a terminal prior to establishing the other communication session. The acceptance may be in the form of a push notification for acceptance that may be sent at the initial configuration of the other communication session, or may be sent just prior to the initiation of the other communication session being complete.

The communication platform 103 may cause a maintenance of the initiated communication session for at least one lifespan. The at least one life span may be any length of time that may be determined based on, for example, preferences set by the one or more users of the terminals, configuration settings of the one or more applications 111 and/or services 109 associated with the communication session, and/or based on the operator of the communication platform 103. Further, in one embodiment, the lifespan of the subsequent communication session may independent from the lifespan of the initial communication session. Thus, when the initial communication session ends, the subsequent communication session may continue. The subsequent communication session may end when one or more of the users associated with the subsequent communication session ends the session. In one embodiment, the subsequent communication session may last beyond the end of the initial communication session but have a predetermined lifespan following the termination of the initial communication session. For example, the subsequent communication session may be predetermined to last for six hours beyond the end of the initial communication session.

Because the other communication session subsequently created is based on the identification parameters determined from the initial communication session, the communication platform 103 provides authentication of the one or more terminals participating in the other communication session tied to the identification parameters. For example, only one mobile terminal (e.g., mobile phone) is associated with a mobile phone number or MSISDN. By the communication platform 103 determining the MSISDN numbers of the terminals participating in the initial communication session, the communication platform 103 can determine that the terminals are authentic. In one embodiment, when a terminal initially registers with the communication platform 103, the user may supply some sort of additional authentication credential. The communication platform 103 may determine the identification parameters of the terminals participating in a communication session and the authentication credentials to authenticate the terminals.

The communication platform 103 may be independent from one or more of the services 109 that are used to exchange information between the terminals (e.g., UE 101). In which case, the communication platform 103 may cause an initiation of a subsequent communication session between a terminal and one of the services 109. Under this scenario, the communication platform 103 causes a transmission of the identification parameters associated with the terminal to the service 109a. The service 109a may respond with one or more signals for causing the initiation of the communication session between the service 109a and the terminal. In one embodiment, the communication platform 103 may act as a facilitator of a communication between two or more terminals that provided by a service 109a. For example, the communication platform 103 can establish another communication session between each one of the terminals participating in an initial communication session via a service 109a, such that the terminals are able to communicate with each other during the communication session through the service 109a.

As discussed above, the communication platform 103 allows for the initiation of a communication session between one or more terminals participating in an existing communication session. By way of example, three UE 101 may be participating in a conference call. A subsequent communication session may be established between the three UE 101 to transfer documents between the UE 101 related to the conference call. To add additional terminals to the subsequent communication session, the additional terminal may be added the same way a terminal would be added to the conference call. Thus, one of the UE 101 may call a fourth UE 101 and add the fourth UE 101 to the conference call, which initiates the communication platform 103 to join the fourth UE 101 to the subsequent communication session. Further, where the initial communication session may have ended prior to the other communication session ending, one of the participating terminals may create a subsequent communication session with the fourth terminal to join the fourth terminal to the other communication session. For example, three UE 101 may be participating in the exchange of location information through another communication session based on an initial conference call between the three UE 101 that has since ended. To add a fourth UE 101 to the other communication session, one of the three UE 101 can simply call the fourth UE 101 via a phone call, which will initiate joining the fourth UE 101 to the subsequent communication session. In one embodiment, where one or more of the terminals participating in a communication session created based on an initial communication session attempts to join an additional terminal to the communication session, the communication platform 103 may query the terminals participating in the communication session for approval to join the additional terminal. The request may be sent via a push notification to the other terminals and act as additional security to ensure that no unauthorized/unknown/undesired terminal and/or user joins the created communication session.

In one embodiment, two terminals may be participating in a communication session, such as a phone call, and the users of the terminals may want to establish another communication session to exchange information. However, only one of the terminals may be registered with the communication platform 103. In such a case, the communication platform 103 may not have information saved on the other terminal.

In such a scenario, the communication platform 103 may send a notification to the other terminal based on the identification parameter of the other terminal included in the request of the registered terminal. The notification may ask for the other terminal to register with the communication platform 103. However, in one embodiment, the communication platform 103 can create communication sessions that involve unregistered terminals, such as by communicating with the unregistered terminals based on the information provided in the request to create a new communication session (e.g., such as the identification parameters that allow the communication platform 103 to directly communicate with the non-registered terminals).

By way of example, the UE 101, the communication platform 103, the services platform 107 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
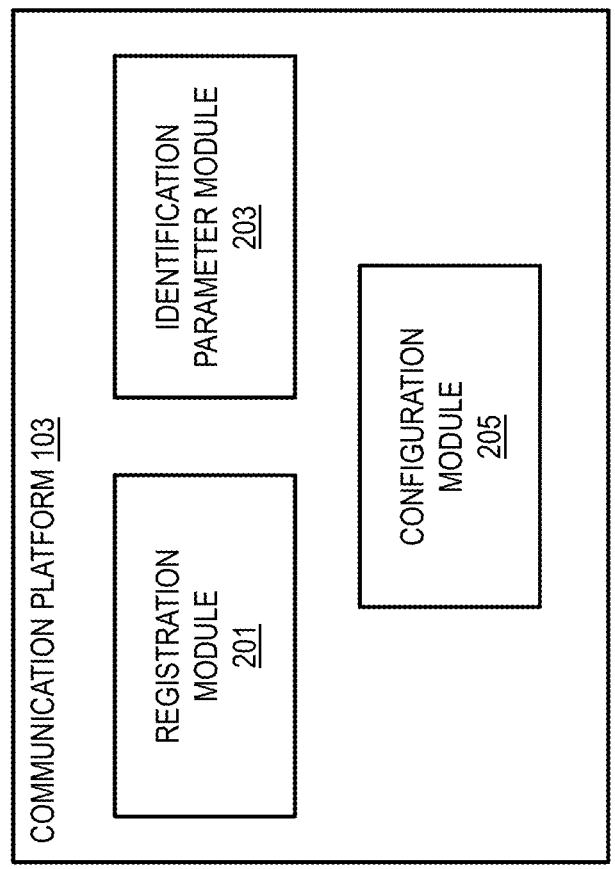
FIG. 2 is a diagram of the components of a communication platform, according to one embodiment.

FIG. 2 is a diagram of the components of the communication platform 103, according to one embodiment. By way of example, the communication platform 103 includes one or more components for establishing a communication session among terminals based on one or more identification parameters of the terminals associated with an existing communication session. It is contemplated that the functions of these components may be combined in one or more components or performed by other components of equivalent functionality. By way of example, in one embodiment, the functions of these components may be combined and/or embodied into one or more applications 111 executed at the UE 101. Further, in one embodiment, the functions of these components may be combined and/or embodied into one or more services 109. For example, the communication platform 103 may be embodied into one or more services 109 that are specific to the type or kind of information that is exchanged between terminals participating in a subsequent communication session, such as location-based services 109. The communication platform 103 may include a registration module 201, an identification parameter module 203, and a configuration module 205.

The registration module 201 performs the functions and processes associated with terminals (e.g., UE 101) registering with the communication platform 103. In one embodiment, a terminal contacts the registration module 201 to register. The registration may include exchanging one or more identification parameters that uniquely identify the terminal as compared to other terminals that may contact the communication platform 103. By way of example, a terminal registering with the registration module 201 may transfer an MSISDN number associated with the terminal to the registration module 201. The registration module 201 can then identify the terminal participating in communication sessions based on the MSISDN number. In one embodiment, the terminal transfers multiple identification parameters to the registration module 201 to encompass various forms of communication, such as an e-mail address for e-mail communications and a MSISDN number for phone calls and SMS/MMS messages, etc. In one embodiment, the registration module 201 sends a link to a terminal that is not registered with the communication platform 103 prior to initiating a communication session associated with the terminal. The registration module 201 may then interface with the terminal for registration.

In one embodiment, communications between the terminals and the communication platform 103 may be push-type communications. One or more push-based communication services 109 may be used so that the communication platform 103 may push messages regarding initiating communication sessions to the terminals. In such an embodiment, when the terminals register with the registration module 201, the registration may include transferring a parameter associated with the push-type communication. Such parameters may include, for example, a uniform resource locator and/or a uniform resource indicator. When the communication platform 103 sends messages and/or information to the terminals regarding initiating subsequent communication sessions, the communication platform 103 may send the messages and/or information via the one or more push-based communication services 109 according to the parameter. However, in one embodiment, the communication platform 103 may allow for direct push communications or may be embodied in a service that allows for direct push communications.

The identification parameter module 203 determines from the communication sessions and/or requests to establish subsequent communication sessions the identification parameters associated with the terminals. Based on the determined identification parameters, the identification parameter module 203 can determine the terminals that are associated with the communication session and which terminals to associate with the subsequently created communication session. In one embodiment, where the communication platform 103 uses one or more push-type communications to communicate with the terminals regarding initiating the communication session, the identification parameter module 203 may also determine the parameters associated with communicating with the terminals via the push notifications.

The configuration module 205 configures one or more applications 111 at the terminals (e.g., UE 101) according to the parameters and/or settings necessary for initiating the communication sessions. By way of example, the configuration module 205 may determine the protocols and/or ports associated with the communication session, and configure the applications 111 and/or the terminals generally based on the protocols and/or ports. The configuration module 205 may also control the lifespan of the subsequent communication sessions. The lifespan may be independent from the initial communication session, or may dependent on the initial communication. For example, the lifespan of the other communication session may extend beyond the end of the initial communication session, but may be based on a set period of time that begins based on the termination of the initial communication session.

Figure 3:
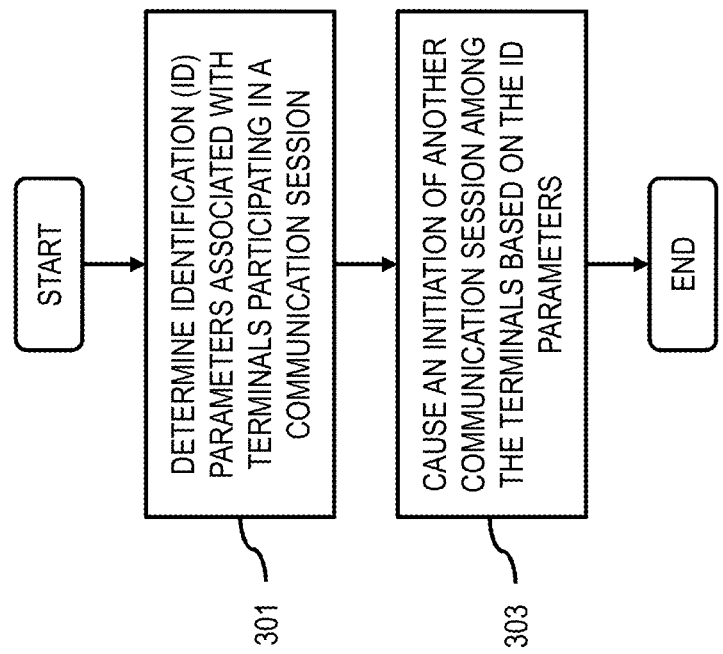
FIG. 3 is a flowchart of a process for initiating a communication session based on one or more identification parameters of terminals associated with an existing communication session, according to one embodiment.
Figure 12:
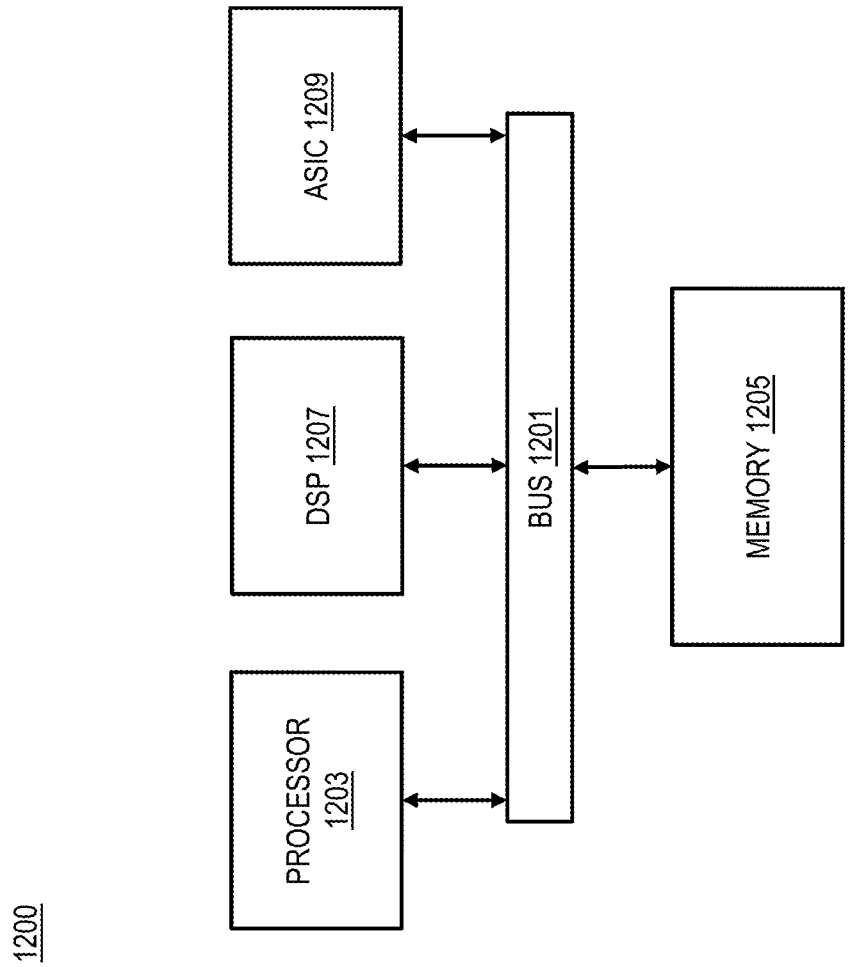
FIG. 12 is a diagram of a chip set that can be used to implement an embodiment of the invention.

FIG. 3 is a flowchart of a process for initiating a communication session based on one or more identification parameters of terminals associated with an existing communication session, according to one embodiment. In one embodiment, the communication platform 103 performs the process 300 and is implemented in, for instance, a chip set including a processor and a memory as shown in FIG. 12. In step 301, the communication platform 103 determines one or more identification parameters associated with one or more terminals participating in at least one communication session. The terminals may be participating in any type of communication session, such as a voice call (e.g., phone call, VoIP call, etc.), an SMS and/or MMS message, an e-mail message, instant messaging, and the like. By way of example, a user may use a UE 101a to make a phone call to another user associated with a UE 101b. The communication session constitutes the phone call between the two UE 101. Further, there may be more than two terminals associated with the communication session, such as where more than two UE 101 are participating in a conference call.

The identification parameters may be based on the type of communication session. For example, where the communication session is a phone call, the identification parameters may constitute the telephone numbers associated with the two devices of the phone call. Where the communication is an e-mail, the identification parameters may be the e-mail addresses used for the e-mail. By way of example, possible identification parameters include a Mobile Subscriber Integrated Services Digital Network number MSISDN, a mobile equipment identifier (MEID), an electronic serial number (ESN), a phone number, an e-mail address, and the like.

The communication platform 103 may determine the identification parameters by the terminals associated with the communication session transmitting the identification parameters to the communication platform 103, and/or based on the communication platform 103 querying for the identification parameters upon receiving a request for initiating a communication session. By way of example, a user may execute an application at the UE 101 that requires a subsequent communication session to transfer information to other terminals. Upon the application executing, the application may transmit the identification parameters of the terminals associated with the existing communication session to the communication platform 103. Where the communication platform 103 is embodied in an application 111a associated with the UE 101, the one or more applications 111 that execute and require a subsequent communication session may interface with the application 111a at the UE 101 that embodies the communication platform 103.

In step 303, the communication platform 103 causes, at least in part, an initiation of at least one other communication session among the one or more terminals based, at least in part, on the one or more identification parameters. The other communication session that is initiated can be any type of communication. In one embodiment, the other communication session that is initiated may be a data connection between the one or more terminals that permits the exchange of data associated with one or more applications 111 executing at the one or more terminals that initiated the request at the communication platform 103. By way of example, the two terminals may be executing a location-based application 111a and the other communication session that is initiated between the two terminals may be a data connection that allows for the transmission of location information between the two terminals. In initiating the communication session, the communication platform 103 can configure the applications 111 that will subsequently use the communication session, such as providing the applications 111 with the protocols, ports or other network information used to communicate of the communication session. In one embodiment, upon initiating the communication session, the communication platform 103 may maintain the session by, for example, acting as an intermediary between the two or more terminals participating in the communication session. Where the two or more terminals are communication through a service 109a, the communication platform 103 may act as an intermediary between the two or more terminals and the service 109a to maintain the communication session. In one embodiment, the communication platform 103 may transfer maintaining the communication session to one or more other services 109, such as a service 109a that aids in providing the one or more functions and/or processes that are used in exchanging information between the terminals.

Thus, based on the above process 300, the communication platform 103 allows for the creation of ad-hoc social networks without requiring a user to separately create the ad-hoc social network beyond starting an initial communication session. For example, rather than having to execute an application and configure the application to create an ad-hoc social network to exchange information between two or more terminals, a user may simply initiate a communication session between the desired terminals and the communication platform 103 may provide the functionality to establish the communication session for creating the ad-hoc social network. Thus, for example, the user only needs to select a friend from a contacts list and place a call or send a message to the friend to create a ad-hoc social network with the friend to exchange information.

Figure 4:
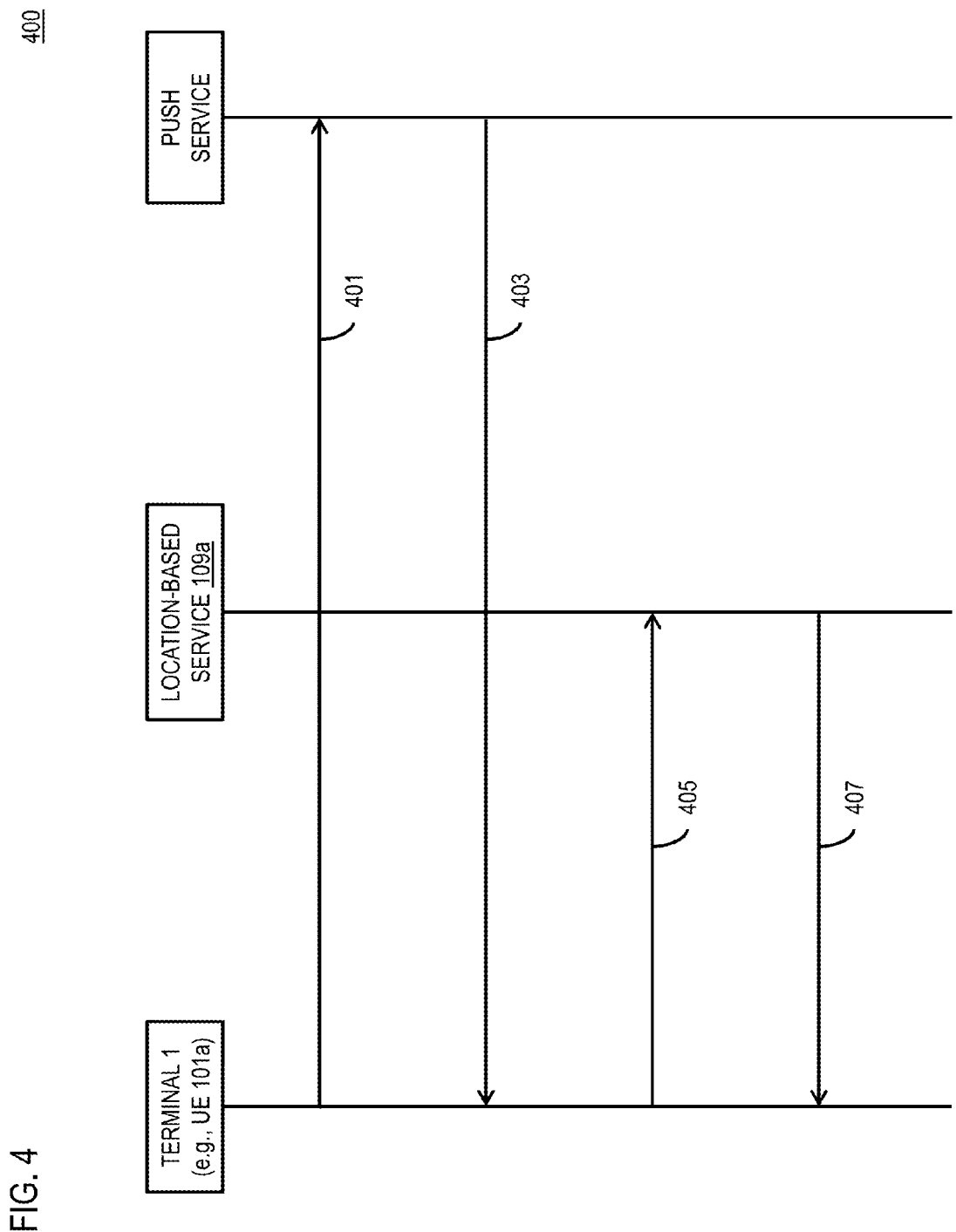
FIG. 4 is a sequence diagram for registering a terminal with the communication platform, according to one embodiment.

FIG. 4 is a sequence diagram for registering a terminal with the communication platform 103, according to one embodiment. In one embodiment, the communication platform 103 performs the sequence 400 and is implemented in, for instance, a chip set including a processor and a memory as shown in FIG. 12. The sequence 400 may be associated with a scenario where a service 109a, such as a location-based service, provides information regarding the locations of the terminals to other terminals via communication sessions. Thus, the functions and/or processes of the communication platform 103 may be embodied within the location-based service 109a. Further, the communication platform 103 and the location-based service 109a may communicate with the terminals via push notifications through a push service.

At sequence 401, terminal 1, which may be one of the UE 101, registers with a push service for creating a parameter for pushing data to the terminal 1. As discussed above, the parameter may be a uniform resource locator (push URL). However, the parameter may be any type of parameter for being able to send push-based communications to the terminal 1. Upon determining the push URL, the push service sends the push URL back to the terminal 1, at sequence 403.

Next, at sequence 405, terminal 1 registers with the location-based service 109a, and specifically with the communication platform 103 embodied within the location-based service 109a. To register, by way of example, terminal 1 transmits one or more identification parameters associated with the terminal in addition to the push URL. By way of example, for communication sessions based on phone calls between the terminal and one or more other terminals, the identification parameter may include an MSISDN number. The location-based service 109a then stores the identification parameter correlated with the push URL. After sequence 405, terminal 1 is registered with the location-based service 109a, and specifically with the communication platform 103 embodied within the location-based service 109a. Optionally, at sequence 407, the location-based service 109a may transmit a message, such as via the push URL, back to terminal 1 indicating that the registration is complete.

Figure 5:
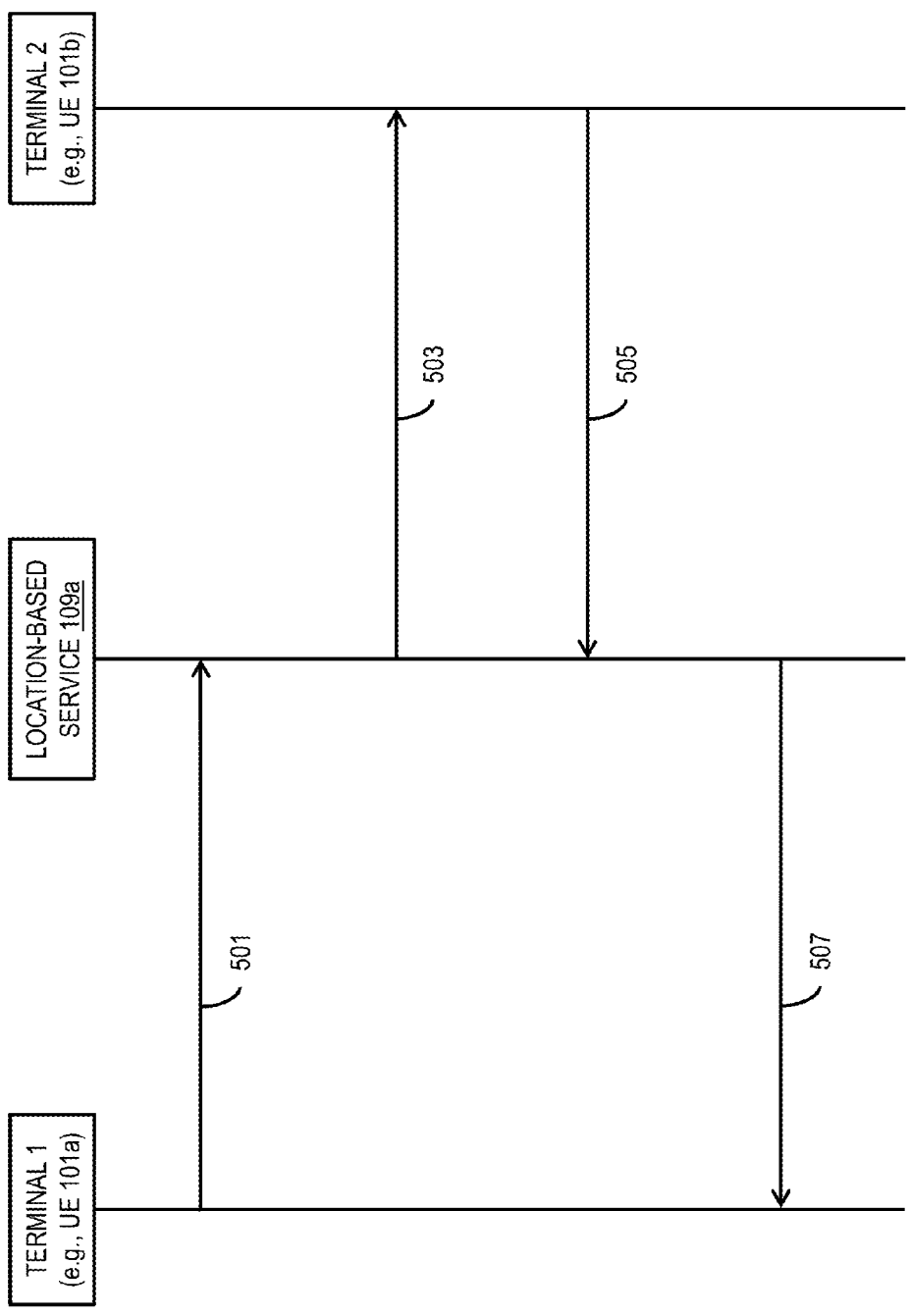
FIG. 5 is a sequence diagram for initiating a communication session based on one or more identification parameters of terminals associated with an existing communication session, according to one embodiment.

FIG. 5 is a sequence diagram for initiating a communication session based on one or more identification parameters of terminals associated with an existing communication session, according to one embodiment. In one embodiment, the communication platform 103 performs the sequence 500 and is implemented in, for instance, a chip set including a processor and a memory as shown in FIG. 12. The sequence 500 may be associated with a scenario where a service 109a, such as a location-based service 109a, provides information regarding the locations of the terminals to other terminals via communication sessions. Thus, the functions and/or processes of the communication platform 103 may be embodied within the location-based service 109a. Further, the communication platform 103 and the location-based service 109a may communicate with the terminals via push-type communications. The push-type communications may be sent directly from the location-based service 109a. However, in other embodiments, the push-type communications may be sent indirectly by the location-based service 109a to the terminals via a push service (not shown for illustrative convenience).

Prior to sequence 501, terminal 1 and terminal 2 may participate in a communication session. For example, the user of terminal 1 may initiate a phone call by dialing a phone number associated with terminal 2. However, the communication session may be based on any type of communication, such as an e-mail, an SMS/MMS message, instant messaging, VoIP, etc. By participating in a communication session with terminal 2, the user of terminal 1 has created a communication session were only the users associated with the initial communication session participate.

At sequence 501, the terminal 1 sends a message to the location-based service 109a. The message may be sent as a result of the user associated with the terminal 1 executing an application that exchanges information between terminals and requests a communication session from the communication platform 103. In one embodiment, the location-based service 109a may have a corresponding application 111a at the terminal that, upon execution, communicates with the communication platform 103 associated with the location-based service 109a for initiating a subsequent communication session. The message may include information regarding the terminals associated with the active communication session (e.g., phone call) based on the identification parameters associated with the communication session. For example, the message may include the MSISDN numbers associated with the terminals. Where the communication platform 103 is associated with the location-based service 109*a*, the message may also include information regarding the terminal 1, such as the location of the terminal 1. However, the message may include any type of additional information based on what applications 111 and/or services 109 the communication session is related to.

At sequence 503, the communication platform 103 embodied in the location-based service 109*a* transmits a message to the terminal 2. The message may include the MSISDN number and location associated with terminal 1. In addition, the message may include an application and/or service identification parameter to indicate what application 111*a* at the terminal 2 to activate to receive the information. In response to sequence 503, the terminal 2 activates the application 111*a*. In one embodiment, the terminal 2 may also populate the user interface of the terminal with the location information received from the terminal 1 to illustrate on the user interface the location of the terminal 1. Further, the terminal 2 may determine its own location (e.g., through location based sensors and/or services). In one embodiment, the user of terminal 2 may initiate the application 111*a* associated with the communication session prior to receiving the communication session information from the communication platform 103.

At sequence 505, the terminal 2 transmits a message back to the communication platform 103 embodied in the location-based service 109*a* with the MSISDN numbers of the terminal 1 and the terminal 2. However, in one embodiment, the message may include only one of the MSISDN numbers. In this embodiment, the communication platform 103 may actively monitor the communication sessions that have been initiated between the terminals such that providing only one of the identification parameters may designate what other terminals are associated with the communication session. In one embodiment, the message may also include the location information associated with the terminal 2.

Upon receiving the message from the terminal 2, at sequence 507, the communication platform 103 embodied within the location-base service 109*a* correlates the identification parameters associated with the message to determine that terminal 1 is the intended recipient of the message. Upon determining the intended recipient, the communication platform 103 transmits a message to the terminal 1 regarding the MSISDN number of terminal 2 and the location information associated with the terminal 2. Upon receipt of the message, terminal 1 may populate the user interface with the location information associated with terminal 2. Accordingly, based on the above sequence, terminal 1 and terminal 2 are able to communicate via a subsequent communication session that is established based on the initial communication session that was between the two terminals. Information may continue to be transmitted between the two terminals based on the foregoing sequence.

Figure 6:
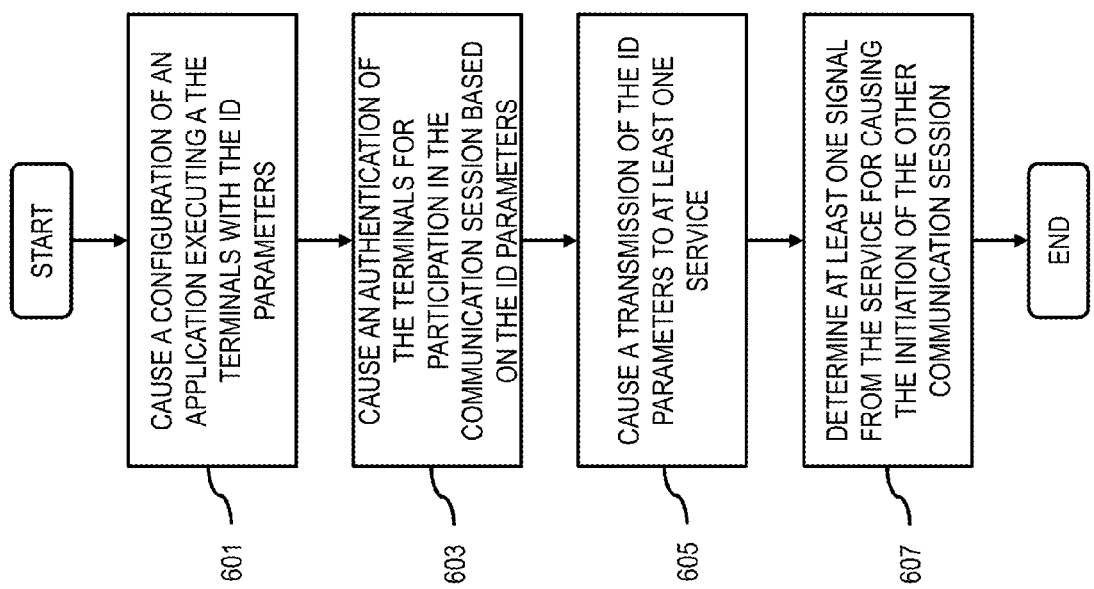
FIG. 6 is a flowchart of a process for configuring an application associated with initiating a communication session based on one or more identification parameters of terminals associated with an existing communication session, according to one embodiment.

FIG. 6 is a flowchart of a process for configuring an application associated with initiating a communication session based on one or more identification parameters of terminals associated with an existing communication session, according to one embodiment. In one embodiment, the communication platform 103 performs the process 600 and is implemented in, for instance, a chip set including a processor and a memory as shown in FIG. 12. In step 601, the communication platform 103 causes, at least in part, a configuration of one or more applications executing at the one or more terminals with the one or more identification parameters. Because the communication session is initiated by the communication platform 103 based on the identification parameters associated with the initial communication session, a user does not need to provide a username and/or a password to configure one or more applications to be able to communicate. Rather, the communication platform 103 may identify the terminals that are participating in the initial communication session and automatically configure applications 111 executed at the UE 101 to be able to participate in the subsequently created communication session. The communication platform 103 may determine one or more protocols used in communicating between the communication terminals. The communication platform 103 may further configure one or more ports at the terminals that are used to initiate and maintain the communication session. The communication platform 103 may further configure any additional settings at the terminals to permit the terminals to communicate of the communication session.

In step 603, the communication platform 103 causes, at least in part, an authentication of the one or more terminals for participation in the at least one other communication session based, at least in part, on the one or more identification parameters. One or more identification parameters may be used to identify the terminal and one or more other identification parameters may be used to authenticate the identity of the terminal. By way of example, in one embodiment the identification parameter may be a phone number associated with a terminal. The communication platform 103 may further detect a subscriber identity module (SIM) associated with the terminal and cross-check the SIM with the phone number to authenticate the terminal.

In one embodiment, the communication platform 103 may be embodied within a service that interfaces with the terminals for exchanging information. However, in one embodiment, the communication platform 103 may be a separate element within the system 100 that is merely used for establishing a communication session between two or more terminals through a service 109*a*, or between a terminal and a service 109*a*. In such an embodiment, at step 605, the communication platform 103 causes, at least in part, a transmission of the one or more identification parameters to at least one service. The service may then distinguish the terminals participating in the communication session and setup the communication session at the service end.

In step 607, the communication platform 103 determines at least one signal from the at least one service for causing, at least in part, the initiation of the at least one other communication session. The signal may include information regarding the other terminals that are taking part in the subsequent communication session. The signal may further include information regarding the other terminals, such as the location of the terminals, routes to reach the other terminals, and the like. The signal may indicate acceptance by all of the other terminals associated with the communication session.

Figure 7:
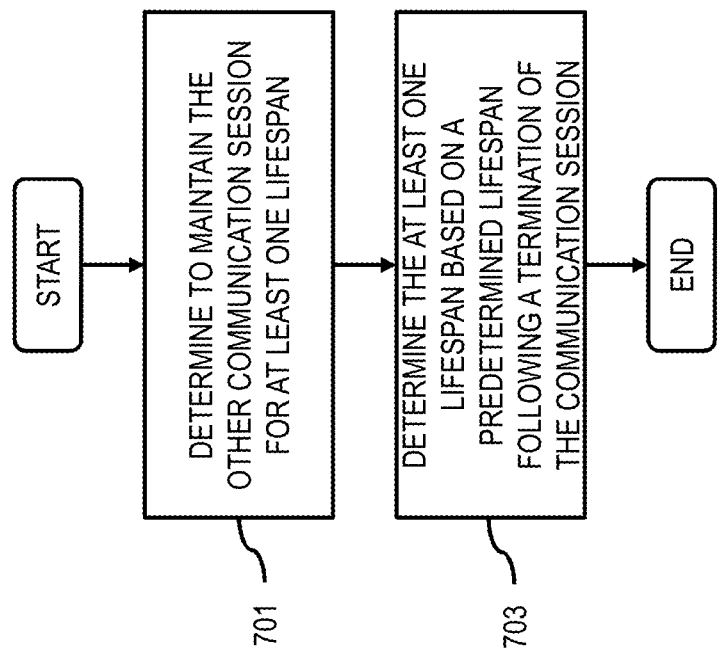
FIG. 7 is a flowchart of a process for maintaining an initiated communication session, according to one embodiment.

FIG. 7 is a flowchart of a process for maintaining an initiated communication session, according to one embodiment. In one embodiment, the communication platform 103 performs the process 700 and is implemented in, for instance, a chip set including a processor and a memory as shown in FIG. 12. In step 701, the communication platform 103 causes, at least in part, a maintenance of the at least one other communication session for at least one lifespan. In one embodiment, the communication platform 103 actively participates in the communication session, such as when the communication platform 103 is acting as an intermediary between two terminals or when the communication platform 103 is embodied in a service 109*a* associated with the communication session. In one embodiment, the lifespan may be independent of the initial communication session, such that the other communication session can last longer or shorter than the initial communication session. In one embodiment, the lifespan of the other communication session may be based on, for example, the completion of a task, such as when two or more terminals reach the same geographic location after being initially separated geographically. Thus, the communication platform 103 maintains the communication session until receiving one or more commands (e.g., such as from one or more applications 111 at the UE 101, or based on the set lifespan).

In one embodiment, in step 703, the communication platform 103 determines the at least one lifespan based, at least in part, on a predetermined lifespan following a termination of the initial communication session. For example, the lifespan of the other communication session may be based on a predetermined lifespan that extends beyond a lifespan of the initial communication session. Thus, when the initial communication session ends, the other communication session may last for a set length of time, such as one hour. Based on this approach, the other communication session may automatically terminate based on the set period of time after the initial communication session terminated. In one respect, this feature provides for extra security so that the other communication session will automatically end without requiring any act from the one or more terminals associated with the communication session, thus preventing any unwanted exchange of information after a set lifespan.

Figure 8:
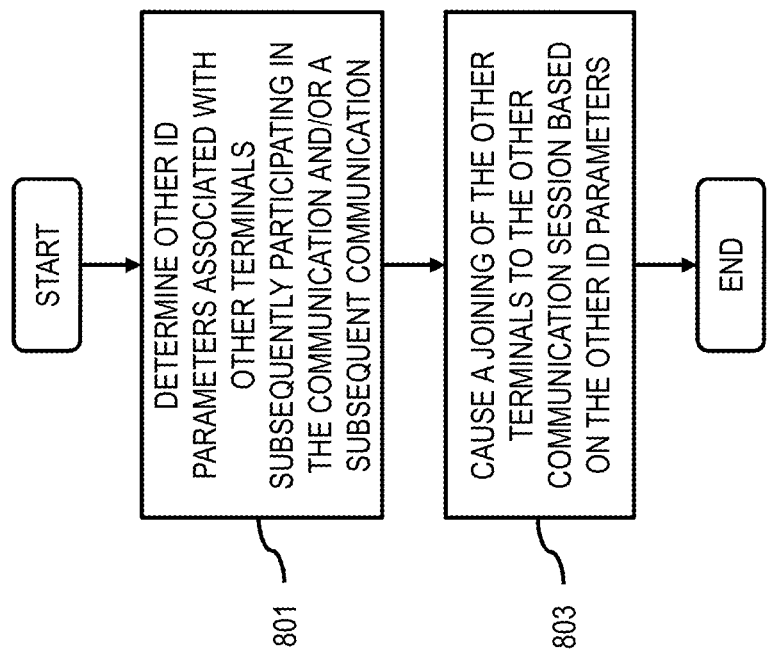
FIG. 8 is a flowchart of a process for initiating a communication session associated with additional terminals associated with a subsequent communication session, according to one embodiment.

FIG. 8 is a flowchart of a process for initiating a communication session associated with additional terminals associated with a subsequent communication session, according to one embodiment. In one embodiment, the communication platform 103 performs the process 800 and is implemented in, for instance, a chip set including a processor and a memory as shown in FIG. 12.

By way of example, an initial communication session between three terminals may have been used to initiate another communication session between the three terminals. However, at some point during the other communication session, it may be desired to add additional terminals to the other communication session. Accordingly, in step 801, the communication platform 103 determines one or more other identification parameters associated with one or more other terminals subsequently participating in the initial communication session, at least one subsequent communication session, or a combination thereof. Where the initial communication session is still active, additional terminals may be added to the initial communication session based on the type of communication session. For example, where the initial communication session was a conference call, the fourth terminal may be added to the conference call according to regular phone call conference mechanisms. Where the initial communication session is not still active, a subsequent communication session may be activated to create a communication session between one of the terminals that are actively participating in the other communication session and the fourth terminal that would like to join the other communication session. According to either of the above-two approaches, the communication platform 103 determines the identification parameters associated with the fourth terminal based on the joining of the fourth terminal to the initial communication session, or based on the fourth terminal being associated with a subsequent communication session with one of the terminals participating in the other communication session.

In step 803, the communication platform 103 causes, at least in part, a joining of the one or more other terminals to the at least one other communication session among the one or more terminals based, at least in part, on the one or more other identification parameters. The process of joining the other terminals to the other communication session based on the other parameters is similar to the initiating process of the other communication session, as discussed with respect to step 303 of process 300. However, rather than joining terminals to a new communication session, the communication platform 103 performs the process to join other terminals to an existing communication session based on the other parameters of the other terminals. Thus, for example, the fourth terminal may be added to the other communication session of the three terminals based on the identification parameters associated with the fourth terminal.

In one embodiment, prior to another terminal joining to a communication session initiated by the communication platform 103, all of the terminals associated with the communication session may be queried as to whether they agree with the acceptance of the additional terminal. For example, where the initial communication session terminated before a fourth terminal attempts to join the communication session between three other terminals, the three other terminals may be queried to determine whether they accept the addition of the fourth terminal. The query may come before or after one of the three terminals causes a subsequent communication session with the fourth terminal to have the fourth terminal join the other communication session. This process adds an extra amount of security since participants in the communication session may receive all of the information that is transferred between the participating terminals.

Figure 9:
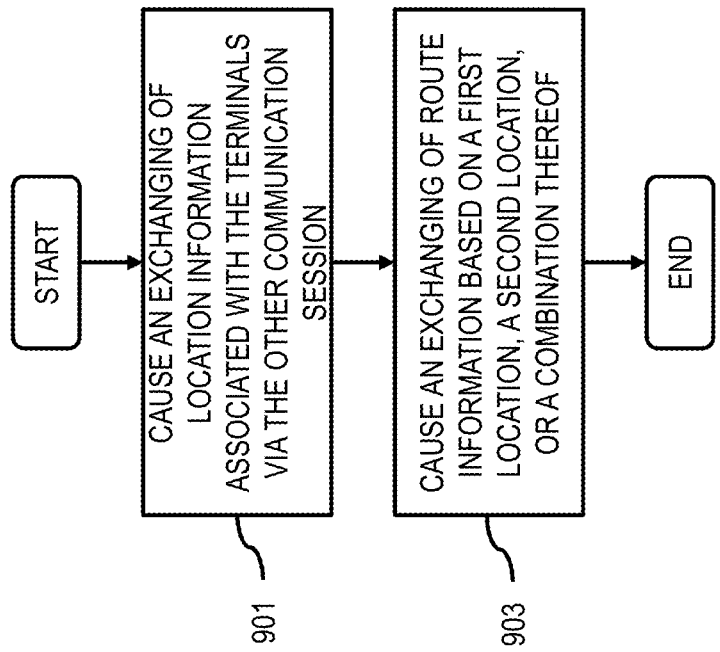
FIG. 9 is a flowchart of a process for exchanging information between terminals via an initiated, other communication session, according to one embodiment.

FIG. 9 is a flowchart of a process for exchanging information between terminals via an initiated, other communication session, according to one embodiment. In one embodiment, the communication platform 103 performs the process 900 and is implemented in, for instance, a chip set including a processor and a memory as shown in FIG. 12. In one embodiment, the communication platform 103 may be embodied in the terminal (e.g., the UE 101) or may be embodied in one or more services 109 that provide for the ability to exchange information between terminals. For example, in one embodiment, a service 109*a* may be a location-based service that allows for the sharing of location information associated with the terminals and/or the users associated with the terminals. Further, the service 109*a* may also allow the sharing of routes that allow for one friend to find the other friend by following the route. In step 901, the communication platform 103 causes, at least in part, an exchanging of location information associated with the one or more terminals via the at least one other communication session. The location information may include the current position of one of the terminals that is participating in the other communication session. By exchanging the current position of the terminal, the user of the other terminal that is participating in the other communication session may locate the user of the terminal.

By way of example, where two friends are at a large music concert, the two friends may call each other. The telephone call may represent an initial communication session. One or both of the friends may activate another application that allows for the exchange of location information. The application may then interface with the communication platform 103 to initiate another communication session to exchange the location information. Based on the telephone numbers of the telephone call, the communication platform 103 may initiate another communication session between the terminals of the two friends. Based on the other communication session, one or both of the friends may share their locations with the other friend. By creating the other communication session, the communication platform 103 causes an exchange of the location information associated with the terminals. However, although the example discussed above is associated with location information, the information exchanged between the two terminals may be any type of information.

In step 903, the communication platform 103 causes, at least in part, an exchanging of route information based, at least in part, on a first location, a second location, or the combination thereof, where the first location is associated with a first terminal of the one or more terminals and a second location is associated with a second terminal of the one or more terminals. Thus, the route is from a first location, such as an origin, and includes information for reaching a second location, such as a destination. In one embodiment, the communication platform 103 may be associated with a service 109*a* that can determine route information based on an origin location and a destination location. The created communication session may be maintained as long as it takes for the two users, and their respective terminals, to reach the same location.

Figure 10A:
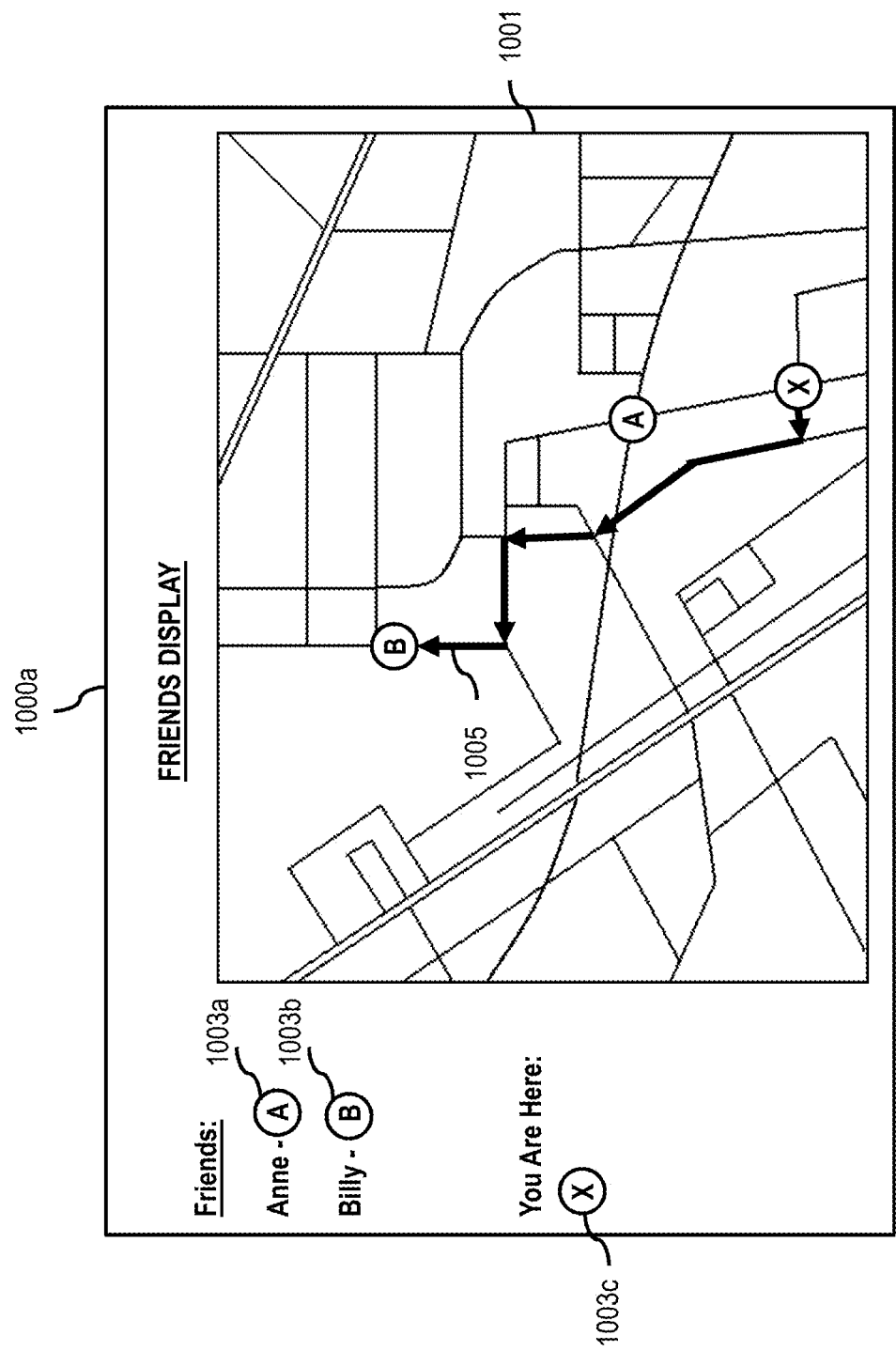
FIGS. 10A-10C are diagrams of user interfaces utilized in the processes and sequences of FIGS. 3-9, according to various embodiments.
Figure 10B:
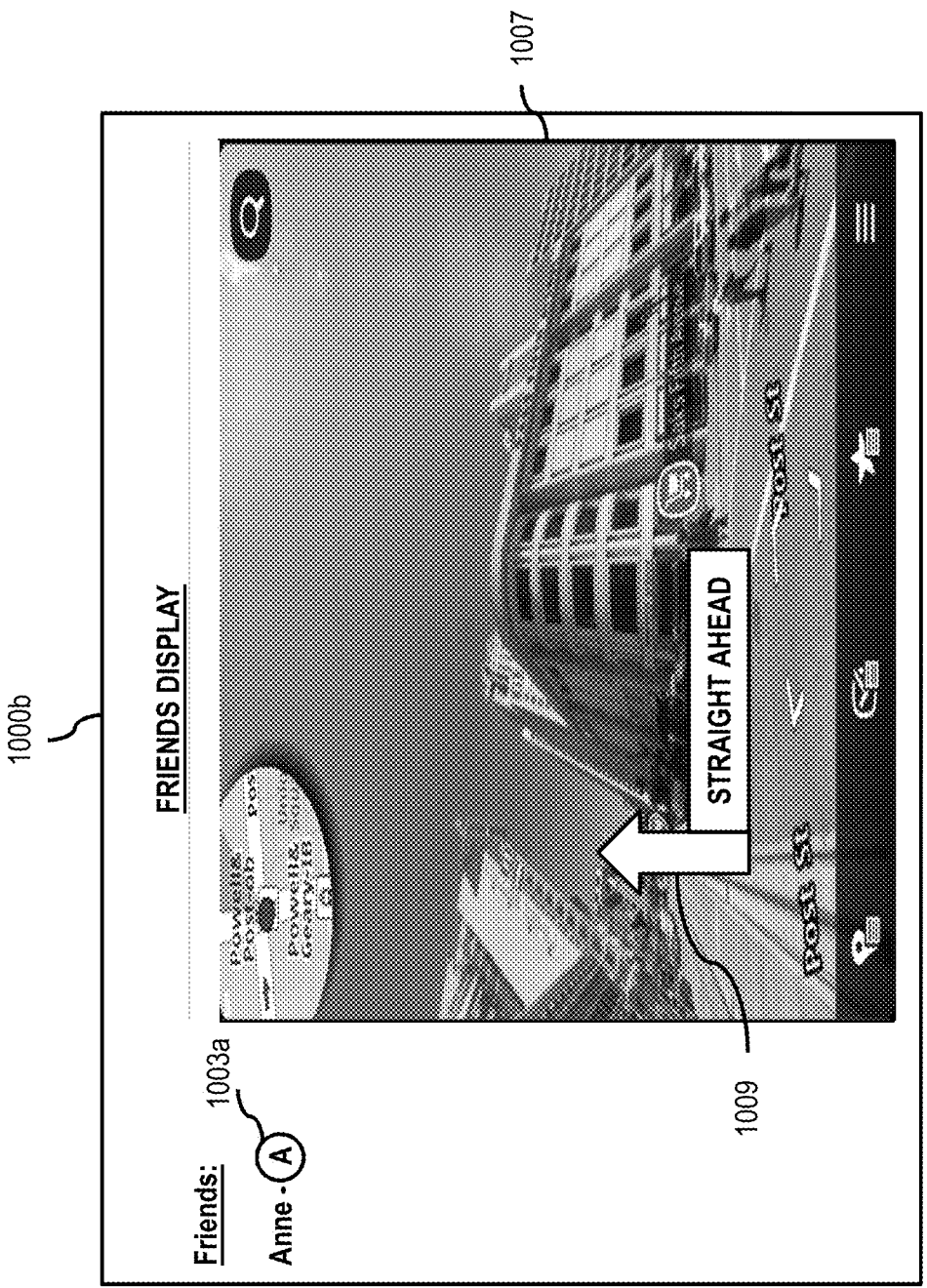
Figure 10C:
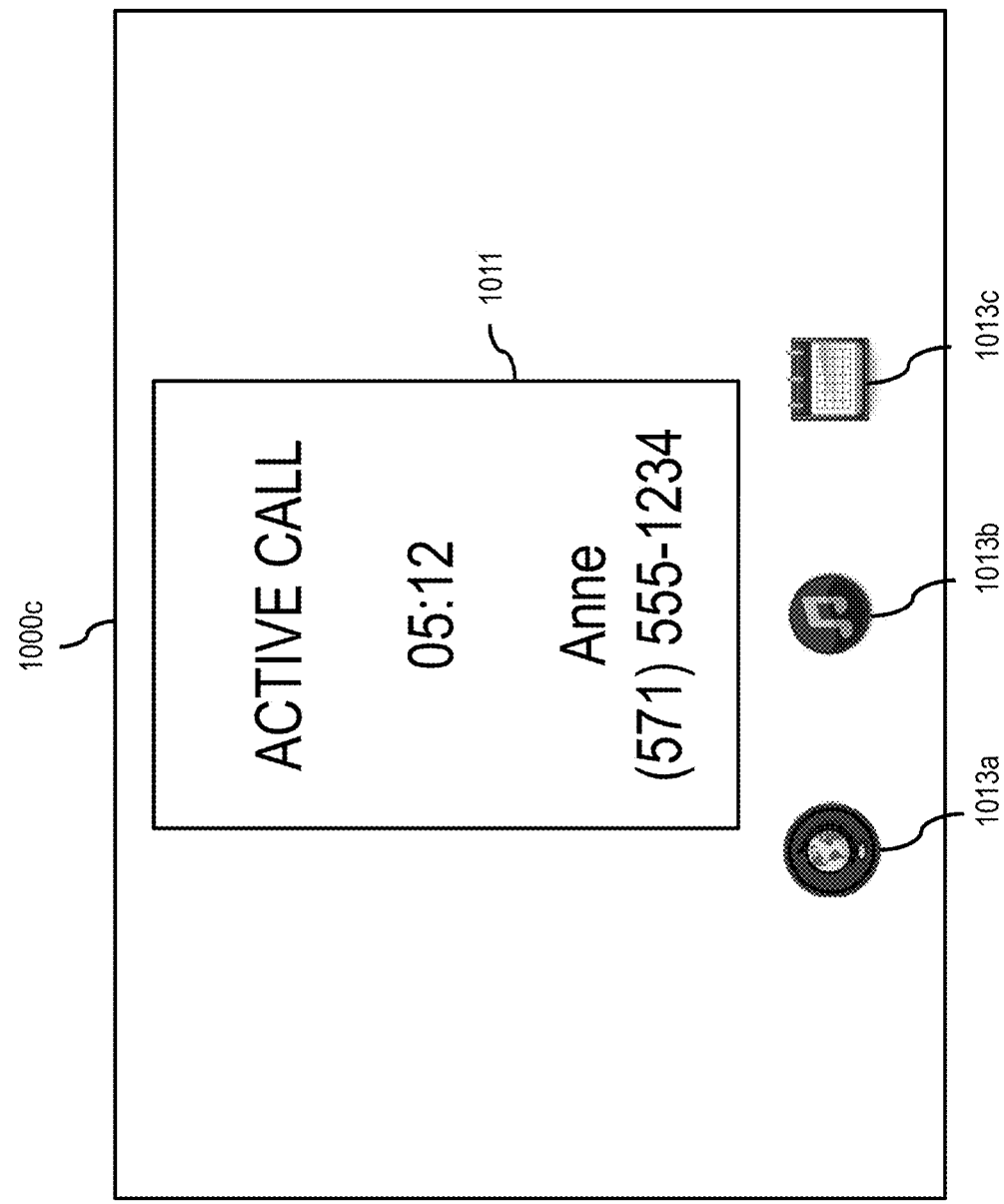

FIGS. 10A-10C are diagrams of user interfaces utilized in the processes of FIGS. 3-9, according to various embodiments. FIG. 10A illustrates a user interface 1000*a* associated with, for example, a UE 101*a* that is participating in a communication session that was created based on identification parameters associated with terminals that were participating in an initial communication session. By way of example, the communication session may allow for the exchange of information regarding the locations of the terminals that are participating in the communication session. The user interface 1000*a* may include a presentation of a map 1001 of a geographical area where the terminals are located. The user interface 1000*a* may further include terminal indicators 1003*a*-1003*c* that represent the terminals and indicate the positions of the terminals with respect to the map 1001. By way of example, there may be three terminals that are participating in the communication session. The terminals may be associated with a user Anne (e.g., terminal indicator 1003*a*), a user Billy (e.g., terminal indicator 1003*b*), and the user associated with the user interface 1000*a* (e.g., terminal indicator 1003*c*). The information regarding the locations of the terminals may be exchanged based on the communication session that was initiated by the communication platform 103 based on an initial communication session associated with the three terminals. Upon establishing the communication session, the location information associated with the terminals may be exchanged between the terminals via the communication session. A route may have also been generated by one or more services 109 (e.g., location-based services 109) or by one or more of the users associated with the terminals participating in the communication session via one or more map-based applications 111 executed at the UE 101. The route information may also be exchanged over the communication session. For example, indicator 1005 represents a segmented route that is generated between terminal indicator 1003*b* and terminal indicator 1003*c*. The user associated with the user interface 1000*a* may then see the route formed by the route segments 1005 and travel between the current location and the location of the user Billy.

In one embodiment, the location information that is transmitted over the communication session may be presented in an augmented reality representation of the surrounding area, as illustrated in the user interface 1000*b* associated with FIG. 10B. Here, the perspective of the surrounding area within the augmented reality representation 1007 is from the perspective of the current location of the user, which may be acquired based on, for example, a camera associated with the terminal presenting the user interface 1000*b*. The augmented reality representation 1007 may present turn-by-turn directions 1009 overlaid on the captured image of the surrounding area. By way of example, the turn-by-turn directions 1009 may be associated with the user of the terminal presenting the user interface 1000*b* following route instructions received from the user Anne so that the current user may travel to the location of the user Anne. The user Anne may have sent the route instructions over the communication session created by the communication platform 103. In one embodiment, the user interface 1000*a* may switch to the user interface 1000*b* based on one or more instructions at the UE 101*a* associated with the user interfaces, such as changing the orientation of the UE 101 (e.g., from portrait to landscape).

FIG. 10C illustrates an exemplary embodiment of a user interface 1000*c* associated with a terminal (e.g., UE 101*a*) participating in a communication session. The call box 1011 may indicate that the user is currently participating in a communication session, such as an active telephone call, with the user Anne. The identification parameter associated with the user Anne may be the telephone number (571) 555-1234. The communication platform 103 can initiate another communication session between the terminal associated with the user interface 1000*c* and Anne's terminal. By way of example, the user associated with the user interface 1000*c* may select one or more of the icons 1013*a*-1013*c*, which may represent one or more applications 111 associated with the terminal. The one or more applications 111 may allow for the exchange and/or transfer of information via on the other, initiated communication session. If the user selects icon 1013*a* associated with a location-based application 111*a*, the communication platform 103 may subsequently establish a communication session between the two terminals for exchanging location information associated with the terminals.

The processes described herein for initiating a communication session based on one or more identification parameters of terminals associated with an existing communication session may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
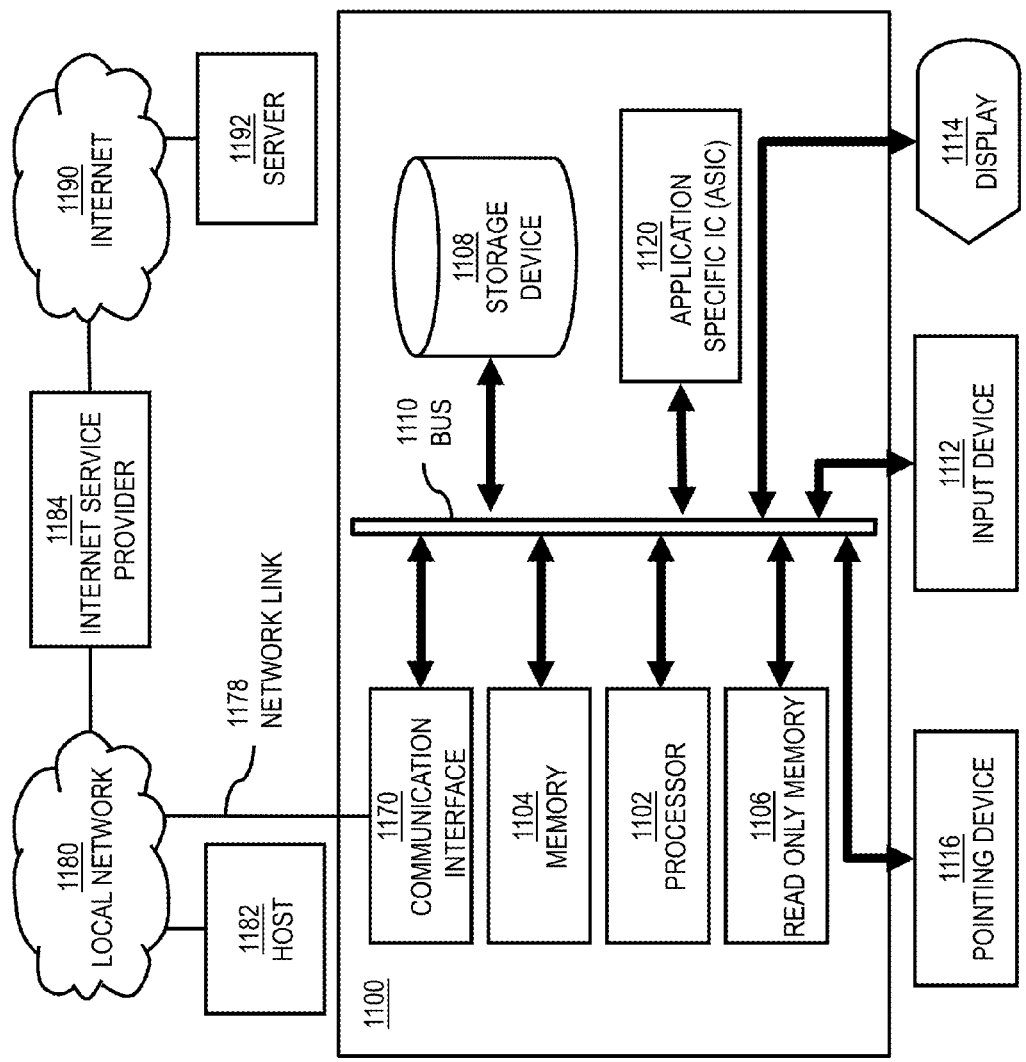
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to initiate a communication session based on one or more identification parameters of terminals associated with an existing communication session as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of initiating a communication session based on one or more identification parameters of terminals associated with an existing communication session.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to initiating a communication session based on one or more identification parameters of terminals associated with an existing communication session. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for initiating a communication session based on one or more identification parameters of terminals associated with an existing communication session. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for initiating a communication session based on one or more identification parameters of terminals associated with an existing communication session, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a phone modem that provides an information communication connection to a corresponding type of phone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile phones like cell phones, the communications interface 1170 includes a radio band electromagnetic transmitter and receiver called a radio transceiver. In certain embodiments, the communications interface 1170 enables connection to the communication network 105 for initiating a communication session based on one or more identification parameters of terminals associated with an existing communication session associated with the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a phone line using a modem. A modem local to the computer system 1100 receives the instructions and data on a phone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to initiate a communication session based on one or more identification parameters of terminals associated with an existing communication session as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of initiating a communication session based on one or more identification parameters of terminals associated with an existing communication session.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to initiate a communication session based on one or more identification parameters of terminals associated with an existing communication session. The memory 1205 also stores the data associated with or generated by the execution of the inventive steps.

Figure 13:
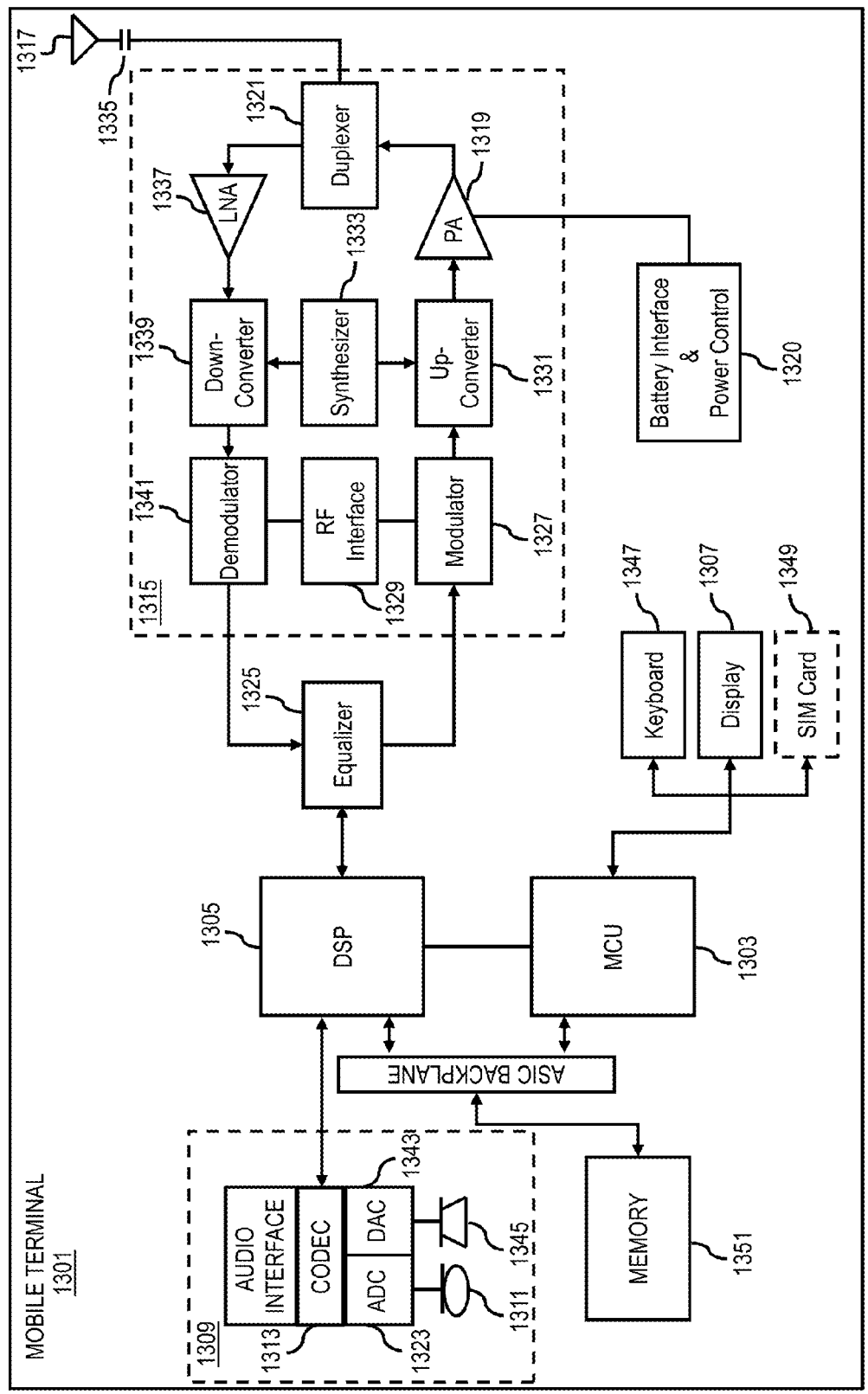
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of initiating a communication session based on one or more identification parameters of terminals associated with an existing communication session. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the phone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of initiating a communication session based on one or more identification parameters of terminals associated with an existing communication session. The display 1307 includes display circuitry configured to display at least a portion of a user interface of the mobile terminal (e.g., mobile phone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote phone which may be another cellular phone, any other mobile phone or a land-line connected to a Public Switched Phone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to initiate a communication session based on one or more identification parameters of terminals associated with an existing communication session. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal phone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising one or more of facilitating a processing of, or processing one or more of (1) data, (2) information, or (3) at least one signal, the (1) data, (2) information, or (3) at least one signal based, at least in part, on the following:
   at least one determination of one or more identification parameters associated with two or more terminals participating in at least one communication session with each other, wherein the one or more identification parameters respectively and uniquely identify the two or more terminals participating in the at least one communication session;
   an initiation of at least one other communication session among the same two or more terminals, wherein the at least one other communication session is initiated independently from and exists concurrently with the at least one communication session, and wherein the at least one other communication session is created based, at least in part, on the one or more identification parameters determined from the at least one communication session;
   a transmission of service information from at least one service over the at least one other communication session to exchange the service information among the two or more terminals.

2. A method of claim 1, wherein the (1) data, (2) information, or (3) at least one signal are further based, at least in part, on the following:
   a configuration of one or more applications executing at the two or more terminals with the one or more identification parameters,
   wherein the initiation of the at least one other communication session is based, at least in part, on the configuration.

3. A method of claim 1, wherein the (1) data, (2) information, or (3) at least one signal are further based, at least in part, on the following:
   a maintenance of the at least one other communication session for at least one lifespan.

4. A method of claim 3, wherein the (1) data, (2) information, or (3) at least one signal are further based, at least in part, on the following:
- at least one determination of the at least one lifespan based, at least in part, on a predetermined lifespan following a termination of the at least one communication session.

5. A method of claim 1, wherein the (1) data, (2) information, or (3) at least one signal are further based, at least in part, on the following:
- an authentication of the two or more terminals for participation in the at least one other communication session based, at least in part, on the one or more identification parameters.

6. A method of claim 1, wherein the (1) data, (2) information, or (3) at least one signal are further based, at least in part, on the following:
- one or more other identification parameters associated with one or more other terminals subsequently participating in the at least one communication session, at least one subsequent communication session, or a combination thereof; and
- a joining of the one or more other terminals to the at least one other communication session among the two or more terminals based, at least in part, on the one or more other identification parameters.

7. A method of claim 1, wherein the (1) data, (2) information, or (3) at least one signal are further based, at least in part, on the following:
- an exchanging of location information associated with the two or more terminals via the at least one other communication session.

8. A method of claim 7, wherein the location information comprises a first location associated with a first terminal of the two or more terminals and a second location associated with a second terminal of the two or more terminals, and the (1) data, (2) information, or (3) at least one signal are further based, at least in part, on the following:
- an exchanging of route information based, at least in part, on the first location, the second location, or the combination thereof.

9. A method of claim 8, wherein the (1) data, (2) information, or (3) at least one signal are further based, at least in part, on the following:
- at least one reception of the route information based, at least in part, on one or more inputs through a user interface of the first terminal, the second terminal, or a combination thereof.

10. A method of claim 1, wherein the (1) data, (2) information, or (3) at least one signal are further based, at least in part, on the following:
- a transmission of the one or more identification parameters to at least one service; and
- at least one signal from the at least one service for causing, at least in part, the initiation of the at least one other communication session.

11. An apparatus comprising:
at least one processor; and
at least one memory including computer program code for one or more programs, the at least one memory and the computer program code configured to, with the at least one processor, cause the apparatus to perform at least the following,
determine one or more identification parameters associated with two or more terminals participating in at least one communication session with each other, wherein the one or more identification parameters respectively and uniquely identify the two or more terminals participating in the at least one communication session;
cause, at least in part, an initiation of at least one other communication session among the same two or more terminals, wherein the at least one other communication session is initiated independently from and exists concurrently with the at least one communication session, and wherein the at least one other communication session is created based, at least in part, on the one or more identification parameters determined from the at least one communication session;
cause, at least in part, a transmission service information from at least one service over the at least one other communication session to exchange the service information among the two or more terminals.

12. An apparatus of claim 11, wherein the apparatus is further caused to:
cause, at least in part, a configuration of one or more applications executing at the two or more terminals with the one or more identification parameters,
wherein the initiation of the at least one other communication session is based, at least in part, on the configuration.

13. An apparatus of claim 11, wherein the apparatus is further caused to:
cause, at least in part, a maintenance of the at least one other communication session for at least one lifespan.

14. An apparatus of claim 13, wherein the apparatus is further caused to:
determine the at least one lifespan based, at least in part, on a predetermined lifespan following a termination of the at least one communication session.

15. An apparatus of claim 11, wherein the apparatus is further caused to:
cause, at least in part, an authentication of the two or more terminals for participation in the at least one other communication session based, at least in part, on the one or more identification parameters.

16. An apparatus of claim 11, wherein the apparatus is further caused to:
determine one or more other identification parameters associated with one or more other terminals subsequently participating in the at least one communication session, at least one subsequent communication session, or a combination thereof; and
cause, at least in part, a joining of the one or more other terminals to the at least one other communication session among the two or more terminals based, at least in part, on the one or more other identification parameters.

17. An apparatus of claim 11, wherein the apparatus is further caused to:
cause, at least in part, an exchanging of location information associated with the two or more terminals via the at least one other communication session.

18. An apparatus of claim 17, wherein the location information comprises a first location associated with a first terminal of the two or more terminals and a second location associated with a second terminal of the two or more terminals, and the apparatus is further caused to:
cause, at least in part, an exchanging of route information based, at least in part, on the first location, the second location, or the combination thereof.

19. An apparatus of claim 18, wherein the apparatus is further caused to:

receive the route information based, at least in part, on one or more inputs through a user interface of the first terminal, the second terminal, or a combination thereof.

20. An apparatus of claim 11, wherein the apparatus is further caused to:
cause, at least in part, a transmission of the one or more identification parameters to at least one service; and
determine at least one signal from the at least one service for causing, at least in part, the initiation of the at least one other communication session.

\* \* \* \* \*

UNITED STATES PATENT AND TRADEMARK OFFICE
CERTIFICATE OF CORRECTION

PATENT NO. : 9,553,933 B2  
APPLICATION NO. : 13/538363  
DATED : January 24, 2017  
INVENTOR(S) : Paulius Meskauskas et al.

Page 1 of 1

It is certified that error appears in the above-identified patent and that said Letters Patent is hereby corrected as shown below:

On the Title Page

Item (73), the Assignee information which reads:  
"Nokia Corporation"

Should read:  
"Nokia Technologies Oy"

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*